United States Patent [19]

Bambrick

[11] Patent Number: 4,673,664

[45] Date of Patent: Jun. 16, 1987

[54] SHAPE FOR EXTRUDED CATALYST SUPPORT PARTICLES AND CATALYSTS

[75] Inventor: William E. Bambrick, Old Greenwich, Conn.

[73] Assignee: American Cyanamid Company, Stamford, Conn.

[21] Appl. No.: 785,185

[22] Filed: Oct. 7, 1985

[51] Int. Cl.$^4$ .............................................. B01J 35/02
[52] U.S. Cl. .................................... 502/439; 502/527
[58] Field of Search ................. 502/439, 527; 428/592

[56] References Cited

U.S. PATENT DOCUMENTS

| 299,285 | 5/1884 | Spruce | 428/592 |
|---|---|---|---|
| 4,022,009 | 5/1977 | Van Assendelft | 428/592 X |
| 4,495,307 | 1/1985 | Clements | 502/527 X |

*Primary Examiner*—W. J. Shine
*Attorney, Agent, or Firm*—Gordon L. Hart

[57] ABSTRACT

Improvement of pressure drop in fixed bed reactors is obtained using catalysts or catalyst support particles which are helical lobed, polylobal extrudates having the shape of three or four strands wound helically about the axis of extrusion along the length of the particles. Catalysts are described for use in hydrotreating of petroleum distillation fractions and residues.

6 Claims, 3 Drawing Figures

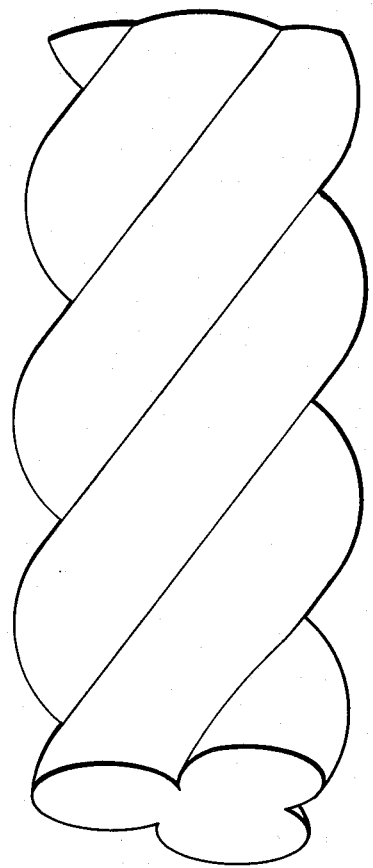
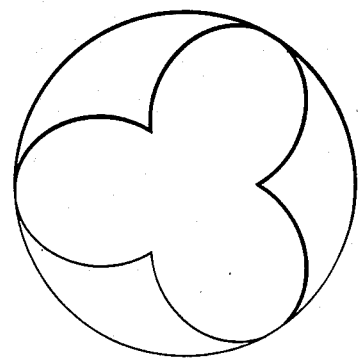
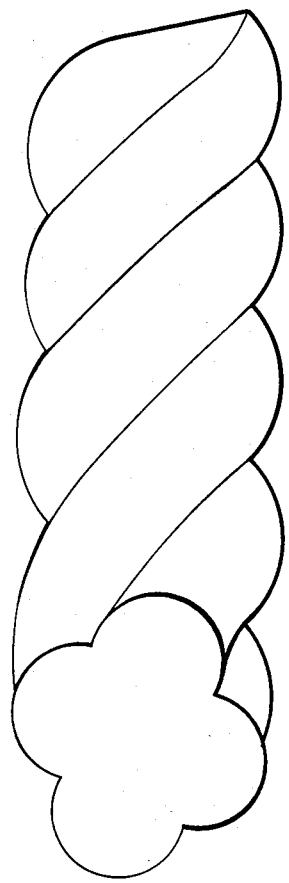
FIG. 1
FIG. 2
FIG. 3

SHAPE FOR EXTRUDED CATALYST SUPPORT PARTICLES AND CATALYSTS

The invention relates to improvements in catalysts to be used for example in petroleum refining and particularly relates to improved shapes for catalyst support particles and catalysts which may be used to advantage in fixed bed catalytic reactors.

Shaped catalyst extrudates as supports for catalyst particles used in hydrodesulfurizing petroleum distillation residues were described in U.S. Pat. No. 3,764,565. Decrease of pressure drop across fixed-bed reactors packed with catalysts made with those shaped supports, as compared with cylindrical catalysts, was described. The benefits of using catalysts on extruded polylobal catalyst supports for hydrotreating of petroleum distillation fractions and residues were described in U.S. Pat. Nos. 3,990,964 and 4,028,227. In the latter patents, improvement of catalytic activity using straight lobed polylobal-shaped catalyst particles described in those patents as compared with activity using cylindrical particles was described.

A recent European Patent Office Publication No. 80-100,337 described catalysts made on extrudate support particles having a cross section of two intersecting circles extended as a double cylinder winding helically along the length of the particle. Those catalysts were described for use as hydrodesulfurizing catalysts.

The invention provides a linear extruded catalyst support particle having the outer shape of three or four segments helically wound about a straight linear axis (the axis of extrusion). The shape of the particle is defined by the outer boundary surfaces of the helically wound segments. The particle is entirely filled within the outer surface boundaries of the three or four segments.

BRIEF DESCRIPTION OF THE DRAWINGS

FIG. 1 is an end view of an extruded particle embodying the invention with three helically wound segments.

FIG. 2 is an isometric view of the particle of FIG. 1.

FIG. 3 is an isometric view of a particle having four helically wound segments.

A preferred embodiment, for example, is an extrudate particle having the shape defined by outer surfaces of three cylindrical segments twined together helically along the extrusion length. The surface boundaries of the particle are the outer surfaces of the three twined segments, i.e. the lobal surfaces between lines of intersection (or tangency) of each segment with the other two. A cross section of three twined cylinders comprises three symetrically intersecting or tangent ellipses. The area of this cross section is defined by the outer arcs of those ellipses. This cross section is illustrated in FIG. 1. The shape of a helical extension of this cross section is defined by extending the cross section along a perpindicular axis and rotating the cross section on its center as it progresses along the axis. The resulting helical shape is illustrated in FIG. 2. Similarly, a symmetrical helical extrusion shape having four lobes can be defined by extending and rotating a cross section formed by four symetrically intersecting or tangent ellipses of equal diameter along a perpindicular axis. The cross section and the extended helical shape with four such lobes are illustrated in FIG. 3. In variations, other lobed cross sections, e.g. three or four tangent or intersecting circles, can be rotated along an axis to form other helical lobed linear extrudate shapes.

Catalyst support extrudates having the helical shapes described must be formed by extrusion of the support material through dies that are shaped to form the helical extrudate shapes. One problem was to make dies that would produce the helical shapes. Dies having suitably shaped holes of large diameters might be formed by machining the holes in a die plate, but to form such dies of very small diameters, e.g. 3 mm diameter or smaller, no practical machining technique was known to do this. In the past, straight line extrusion dies were made by forming an extrusion plate of a thermosetting plastic material penetrated by an array of straight cylindrical or shaped pins perpindicular to the faces of the plate. The pins formed straight line extrusion die holes through the plate. After the plastic was set, the plate was simply lifted away to withdraw the straight pins from die holes that were formed in the plate by the pins. Helix-forming die plates can be similarly made by using helical pins, but the individual pins can be withdrawn from die holes in the plate only by unscrewing each helical pin out of the die hole that it has formed. A pattern for a suitable helical pin for this purpose can be made by twisting three or four wires of suitable size into a wire rope of the desired pitch. The inside surfaces of a die hole formed by a pin having this pattern will conform to the outer helical surfaces of the wire rope pattern. In the extrusion process, when extrusion material is forced through the die hole the die will produce an extrudate having the helical lobed outline of the pattern.

Materials for making the helical extrudates may be any of the same materials that have been used for making other extruded catalysts and catalyst supports. Extrusion feeds are typically prepared by mulling alumina powder with water to make extrudable pastes. The alumina may be any of several precipitated aluminas or it may be a rehydrated alumina, or any of the specialty aluminas such as those prepared from aluminum alkyls, etc. The composition of the extrusion material may include catalyst materials or precursors such as solid compounds of molybdenum, for example. Silica and other modifiers may be included in the material to be extruded.

After extrusion of the catalyst supports, they are finished by any desired method, usually by drying and calcining to harden the particles and to obtain the desired porosity and crystalline structure for an intended use.

While the invention is specifically contemplated for improvement of catalysts to be used in fixed bed processes for hydrotreating of petroleum distillation fractions and residues, the shaped particles of the invention may be used more generally in other processes employing a packed bed of extrudate particles, or even in processes employing ebullated catalyst beds.

The helical shape of the catalyst particle is found to improve pressure drop across fixed bed reactors through which liquid or gas reactants, or both, are passed to effect contact of those reactants with the catalysts. When minimum catalyst size for use in a reactor is limited by pressure drop requirements, the particle of the invention can be made to sizes smaller than other particles of known shapes to meet a given pressure drop requirement. The smaller particle size can improve catalyst efficiency by providing better contact and reducing the diffusion effects. Even when compared with straight lobed, polylobal catalyst particles made of the same catalyst support material, the helical lobed particles of the invention are found to improve the pressure drop properties of a catalyst bed. It is supposed that polylobal particles with straight lobes will stack to some extent in a bed, with the lobe of one particle lying in the trough of another thus blocking flow of fluids between such stacked particles and will thereby increase the flow resistance in the bed. With the helical lobed particles of the invention, such blocking of flow between particles by stacking is eliminated.

Adequate crush strength of the catalyst particles is important to maintain useful life of a catalyst bed. Particles must have strength adequate to resist being crushed to powder which would block fluid flow in affected parts of the bed. Crushing can ultimately lead to loss of circulation in the bed.

A regular linear polylobal particle having three straight lobes, i.e. of the kind described in U.S. Pat. No. 3,990,964, has excellent crush strength, even better than that of a cylindrical extrudate particle of the same material and of the same diameter. (For the polylobal particles the diameter referred to is the diameter of the smallest circumscribing circle). A helical polylobal particle, having the same diameter and same cross section as a straight polylobal particle, is found to have considerably less crush strength than the straight lobed polylobal particle. The crush strength of a helical trilobal particle is about one-half the crush strength of a linear trilobal particle. A particle of two helical lobes has only about one-half the crush strength of the three-lobe helical particle. A particle having four helical lobes has about 1.25 times the crush strength of the three-lobe helical particle. Particles compared are all of the same diameter and the same material.

EXAMPLE 1

A circular extrusion plate of Delrin ® thermoplastic polyoxymethylene type acetal resin is molded around six symmetrically spaced pins of helically wound wire rope. The pins extend perpindicularly through both faces of the molded plate. Thickness of the molded plate is 6.35 mm and its diameter is 19.05 mm. The plate is formed by molding a flat, horizontal, circular plate of molten resin around the vertical pins which are held removably in the mold, and then setting the resin by cooling to harden the plate. After removing the molded plate with the pins from the mold, the pins are removed from the plate by unscrewing them, leaving helically shaped holes through the plate. These are the holes through which extrusion paste will be forced to form helical shaped extrudate particles. The pins have been made by twisting two to four strands of wire together to make a wire rope with about 1.77 turns per cm. length, and with diameter about 1.5 mm measured as the diameter of the smallest circle circumscribing the polylobal cross section. The wire rope is cut to lengths to make the pins. In other embodiments helical lobed pins of various lobal shapes can be shaped by machining a wire or rod to a desired helical lobed contour.

Separate extrusion plates are molded using respectively the helical pins made from two, three and four twisted wire strands, for making extrudates that will have two-lobe, three-lobe and four-lobe helical shapes, respectively.

Several of those molded plates are mounted in a die retainer at the end of the extruder barrel of a worm drive extrusion machine.

One may select any suitable material to be formed by extrusion through the dies. Any of the materials that have previously been used for making extruded catalysts or catalyst supports may be used for making the helical extrudate shapes. To illustrate the invention in more detail, a conventional alumina extrusion paste was prepared and formed into the helical shapes by extrusion through dies that were prepared as in the above example.

EXAMPLE 2

Alumina powder is prepared by precipitating aluminum hydroxide by reaction of sodium aluminate and aluminum sulfate in water. The slurry at pH 10.5 is filtered and washed to remove sulfate. The filter cake is repulped in water and nitric acid is added to adjust pH to 7.0–7.5. The slurry is filtered and washed to remove sodium. The solids are repulped and spray dried to make alumina powder.

The alumina powder is mixed with 1.6 parts water per one part alumina, dry basis, and mulled for about one-half hour, adjusting consistency of the mull-mix as needed to make an extrudable paste which is then placed in a worm extruder and forced through the extrusion dies described above. Some adjustment of extrusion speed is required to allow time for the extrusion paste to conform by plastic flow to the shape of the die holes. The helical extrudates are cut to length about 3.2 mm, dried to about twenty wt. percent moisture and then calcined at 650° C. for one hour.

Helical polylobal alumina extrudate particles, prepared as described above, are tested for crush strength by a conventional test using an air piston which presses an anvil against the particle on a stop plate until the particle fails. Weight is applied perpendicular to axis of the particle by the piston. The weight required to crush a particle of about 3.18 mm length is measured for fifty particles taken from a sample. The average of the fifty measurements determines the crush strength of a sample. A two-lobed helical particle made by the method of Example 2 was found to have crush strength of 0.57 Kg/mm. The three-lobed helical particle has crush strength of 1.2 Kg/mm and the four lobed helical particle has crush strength of 1.5 Kg/mm. Crush strength of the two-lobed particle is less than half the crush strength of the three lobed particles. The strength of the three-lobed and four-lobed helical particles are deemed adequate for use in most fixed bed reactors, while strength of the two-lobed helical particle will not usually be adequate.

To measure effect of the helical three-lobe shaped particle on pressure drop across a reactor bed as compared with the prior art straight three-lobe shaped particle, samples of each shape respectively are packed in a 5 cm diameter cylindrical, vertical tube to make a uniform, dense bed of particles standing about 36–37 cm high in the tube. Ends of the tube are fitted with gas inlet and outlet parts and air is forced through the vertical bed at a rate of 243.3 g/hour per $Cm^2$ of cross section of the bed. Pressure is measured at two side ports spaced 30.48 Cm apart along the length of the bed and the difference in pressure between the upper and lower measurements, corrected for measured variations from standard temperature and pressure conditions, yields the pressure drop per foot of bed height at standard conditions. Diameters of the two different shapes of particles were practically the same, i.e. about 1.2 mm. The bed density varied only slightly, being 0.54 g/ml for the straight trilobe and 0.51 g/ml for the helical trilobe. The pressure drop measured in units of pressure drop per unit of bed height for a bed of the linear trilobe shaped particle was greater by a factor of 1.72 than the pressure drop measured across a bed of the helical trilobe shaped particles. Stated inversely, the pressure drop across a bed of the helical extrudate particles was only 58% of the pressure drop across a bed of the straight lobed extrudate particles.

This advantage of very considerably reduced bed resistance i.e. reduced pressure drop, is achieved by the helical-shaped extrudate particles without loss of catalytic activity. Hydrodesulfurization catalysts, made by solution impregnation of molybdenum and cobalt compounds and conversion of these compounds by calcining on the helical trilobal shaped support particles made as described above, as compared with catalysts made the same on extrudate particles of the same material and the same size, but extruded as straight trilobal particles, were tested to determine catalytic activity for desulfurization of petroleum fractions. No significant difference in catalytic activity was found under reaction conditions that were practically the same except for the reduced pressure drop resulting from use of the helical shaped catalyst support.

One can predict that comparative hydrodesulfurization tests operated at the respective different particle sizes as needed to operate the reactors at the same optimum pressure drop, would show an activity increase for the helical lobed catalysts as compared with activity of the straight lobed catalyst, when the reactions are diffusion limited. Accordingly it can be predicted that use of the new helical trilobe and four-lobe shaped catalysts instead of straight lobed catalysts can lead to increased catalytic hydrodesulfurization activity by adjustment of the operating conditions to take advantage of the reduced flow resistance when using the new catalysts. A three to seven percent increase of catalytic activity is expected from such substitution with adjustment of particle size for operation of a reactor at optimum pressure drop.

Use of the helical lobed extrudate particles is not limited to the use described above for making improved hydrotreating catalysts. The demonstrated advantage of reduced pressure drop in packed beds, commends the use of extrudate particles of these shapes in other processes which use a fixed bed of shaped particles such as beds packed with solid extrudate particles of adsorbents, dessicants, catalysts and the like, through which gas or liquid fluids or mixed fluids are circulated for processing.

We claim:

1. A helical shaped, extrudate particle of extruded catalyst material or catalyst support material having the outline shape of three to four segments helically wound about the axis of extrusion along the length of the particle, and filled with extruded material within said outline shape.

2. A helical lobed, polylobal extrudate particle wherein the material of the particle is extruded catalyst or catalyst support material comprising alumina, having the outline shape of three or four strands helically wound about the axis of extrusion along the length of the particle, and filled with extruded material within said outline shape.

3. A particle defined by claim 1 having diameter of about 3 millimeters or less.

4. A catalyst particle comprising at least one catalyst for hydrotreating of petroleum distillation fractions or residues, supported on a helical lobed, polylobal extrudate particle of catalyst or catalyst support material having the outline shape of three or four strands helically wound about the axis of extrusion along the length of the particle and filled with extruded material within said outline shape.

5. A particle defined by claim 1 wherein the extruded cataltyst support material comprises alumina.

6. A catalyst particle comprising at least one catalyst for hydrotreating petroleum distillation fractions or residues supported on a particle defined by claim 1.

* * * * *